(12) United States Patent
Di

(10) Patent No.: US 11,464,207 B2
(45) Date of Patent: Oct. 11, 2022

(54) PET GROOMING TOOL

(71) Applicant: Ningbo Hongdu Model Plastics Co., Ltd., Ningbo (CN)

(72) Inventor: Xin Di, Ningbo (CN)

(73) Assignee: NINGBO HONGDU MODEL PLASTICS CO., LTD., Ningbo (CN)

( * ) Notice: Subject to any disclaimer, the term of this patent is extended or adjusted under 35 U.S.C. 154(b) by 520 days.

(21) Appl. No.: 16/620,691

(22) PCT Filed: Jun. 7, 2018

(86) PCT No.: PCT/IB2018/054083
§ 371 (c)(1),
(2) Date: Dec. 9, 2019

(87) PCT Pub. No.: WO2018/224993
PCT Pub. Date: Dec. 13, 2018

(65) Prior Publication Data
US 2020/0196570 A1    Jun. 25, 2020

(30) Foreign Application Priority Data

Jun. 9, 2017    (CN) .......................... 201720666428.9

(51) Int. Cl.
*A01K 13/00*    (2006.01)
*A46B 5/02*    (2006.01)

(52) U.S. Cl.
CPC .............. *A01K 13/002* (2013.01); *A46B 5/02* (2013.01); *A46B 2200/1093* (2013.01)

(58) Field of Classification Search
CPC ...... A01K 13/002; B26B 21/16; A46B 17/06; A46B 2200/1093; A45D 24/36; A45D 24/10
(Continued)

(56) References Cited

U.S. PATENT DOCUMENTS

| 191,608 | A | * | 6/1877 | Miller | ..................... B26B 19/24 |
| | | | | | 119/617 |
| 309,668 | A | * | 12/1884 | Weightman | .......... A01K 13/002 |
| | | | | | 119/613 |

(Continued)

FOREIGN PATENT DOCUMENTS

| CN | 2525795 Y | 12/2002 |
| CN | 2829351 Y | 10/2006 |

(Continued)

*Primary Examiner* — Peter M Poon
*Assistant Examiner* — Morgan T Jordan
(74) *Attorney, Agent, or Firm* — Muncy, Geissler, Olds & Lowe, P.C.

(57) ABSTRACT

A grooming tool for a pet is disclosed. The grooming tool comprises a handle having a grip portion, a comb comprising teeth and including a blade for combing and removing shed hair from a pet where the comb located at a front end of the handle. The grooming tool also includes a hair removal member for removing shed hair from the comb, wherein the hair removal member is moveable in a direction corresponding to an extension direction of the teeth of the comb, a toggle button movable along a surface of the handle between a first position and a second position and a linkage assembly linking the toggle button to the hair removal member to control movement of the hair removal member; wherein when the toggle button is located at the first position, a front end surface of the hair removal member is located in a retracted position and when the toggle button is moved to the second position, the front end surface of the hair removal member is moved forward to an extended position to remove hair from the comb.

9 Claims, 14 Drawing Sheets

(58) Field of Classification Search
USPC ...... 119/628, 632, 613–617; 15/38, 39, 142, 15/104.5, 169; 132/213.1–214
See application file for complete search history.

(56) References Cited

U.S. PATENT DOCUMENTS

| | | | | |
|---|---|---|---|---|
| 441,136 | A * | 11/1890 | Clements | B26B 21/56 15/236.08 |
| 578,223 | A * | 3/1897 | Elving | A01K 13/002 15/39 |
| 612,843 | A * | 10/1898 | Bodine et al. | A01K 13/002 119/628 |
| 623,201 | A * | 4/1899 | Brain | A01K 13/002 119/608 |
| 926,766 | A * | 7/1909 | Rauh | A45D 24/42 132/137 |
| 971,171 | A * | 9/1910 | Campbell | A45D 24/30 119/616 |
| 1,018,136 | A * | 2/1912 | Slevin | A47L 9/0613 119/606 |
| 1,025,793 | A * | 5/1912 | Endsley | A01K 13/002 119/615 |
| 1,038,273 | A | 9/1912 | Black | |
| 1,050,103 | A | 1/1913 | Clemens | |
| 1,085,063 | A * | 1/1914 | Matthew et al. | B26B 19/24 15/236.08 |
| 1,189,698 | A | 7/1916 | Keating | |
| 1,249,552 | A * | 12/1917 | Taflin | A01K 13/002 119/613 |
| 1,407,638 | A * | 2/1922 | Michael | A01K 13/002 30/30 |
| 1,749,543 | A * | 3/1930 | Oster | B26B 19/066 30/213 |
| 1,875,125 | A * | 8/1932 | Oster | B26B 19/066 30/221 |
| 1,888,688 | A * | 11/1932 | Oster | B26B 19/06 30/221 |
| 2,431,180 | A * | 11/1947 | Le Gore | A01K 13/002 30/30 |
| D154,784 | S * | 8/1949 | Lazar | D28/52 |
| 3,308,500 | A * | 3/1967 | Woodruff | A01K 13/002 119/606 |
| 3,536,080 | A * | 10/1970 | Legan | B26B 21/125 30/30 |
| 3,986,258 | A * | 10/1976 | Liedtke | B26B 21/08 30/30 |
| 4,663,841 | A * | 5/1987 | Custer | B26B 21/42 30/30 |
| 4,709,475 | A * | 12/1987 | Phung | B26B 21/12 132/76.2 |
| 5,267,528 | A * | 12/1993 | Murieen, Sr. | A01K 13/002 119/628 |
| 5,339,840 | A * | 8/1994 | Koppel | A01K 13/002 119/633 |
| 5,353,817 | A * | 10/1994 | Kantor | A01K 13/002 132/148 |
| 6,094,820 | A * | 8/2000 | Adachi | B26B 21/12 30/30 |
| 6,427,633 | B1 * | 8/2002 | Ogden | A01K 13/002 119/600 |
| 6,782,846 | B1 * | 8/2004 | Porter | A01K 13/002 30/34.2 |
| 7,077,076 | B2 * | 7/2006 | Porter | B26B 21/16 119/625 |
| 7,509,926 | B2 * | 3/2009 | Porter | B26B 21/16 119/625 |
| 8,359,755 | B1 * | 1/2013 | Laube | A01K 13/002 30/340 |
| 8,960,129 | B2 * | 2/2015 | Porter | A01K 13/002 119/632 |
| 9,049,844 | B2 * | 6/2015 | Fung | A01K 13/003 |
| 2004/0194728 | A1 * | 10/2004 | Dunn | A01K 13/002 119/625 |
| 2006/0207623 | A1 * | 9/2006 | Kung | A01K 13/002 132/121 |
| 2007/0033758 | A1 * | 2/2007 | Wang | A46B 17/06 15/169 |
| 2007/0084416 | A1 * | 4/2007 | Liao | A01K 13/002 119/625 |
| 2007/0143945 | A1 * | 6/2007 | DiPietro | A46B 9/06 15/117 |
| 2008/0017130 | A1 * | 1/2008 | Porter | A01K 13/001 264/510 |
| 2008/0029044 | A1 * | 2/2008 | Porter | A01K 13/001 119/631 |
| 2008/0078333 | A1 * | 4/2008 | Wang | A01K 13/002 119/611 |
| 2009/0126648 | A1 * | 5/2009 | Porter | A01K 13/002 119/601 |
| 2010/0154718 | A1 * | 6/2010 | Porter | A01K 13/00 119/628 |
| 2010/0162965 | A1 * | 7/2010 | Porter | A01K 13/002 119/601 |
| 2014/0261226 | A1 * | 9/2014 | Fung | A45D 24/42 119/625 |
| 2015/0156985 | A1 * | 6/2015 | Ristaniemi | A01K 13/002 119/611 |
| 2015/0282454 | A1 * | 10/2015 | Porter | A01K 13/00 119/628 |
| 2017/0295753 | A1 * | 10/2017 | Cathaud | A01K 13/002 |
| 2018/0132452 | A1 * | 5/2018 | Dionne | A46B 9/023 |

FOREIGN PATENT DOCUMENTS

| | | | | |
|---|---|---|---|---|
| CN | 101868143 A | | 10/2010 | |
| CN | 101889555 A | | 11/2010 | |
| CN | 101889557 A | * | 11/2010 | ........... A01K 13/002 |
| CN | 104737937 A | * | 7/2015 | ........... A01K 13/002 |
| CN | 107047362 A | | 8/2017 | |
| CN | 107079830 A | | 8/2017 | |
| CN | 107094646 A | | 8/2017 | |
| CN | 206835891 U | | 1/2018 | |
| CN | 206835893 U | | 1/2018 | |
| DE | 20316316 U1 | * | 4/2004 | ........... A01K 13/002 |
| DE | 202013100291 U1 | * | 3/2013 | ........... A01K 13/002 |
| DE | 202018005584 U1 | * | 2/2019 | ........... A01K 13/002 |
| EP | 3290170 A1 | * | 3/2018 | ............ B26B 19/06 |
| FR | 2999871 A1 | * | 6/2014 | ........... A01K 13/002 |
| JP | 2009-066341 A | | 4/2009 | |
| WO | WO-2006114852 A1 | * | 11/2006 | ........... A01K 13/002 |

\* cited by examiner

PET GROOMING TOOL

PRIORITY DOCUMENTS

The present application claims priority from Chinese Utility Model No. 201720666428.9 titled "PET GROOMING TOOL WITH HAIR REMOVAL PUSH PLATE" and filed on 9 Jun. 2017, the content of which is hereby incorporated by reference in its entirety.

TECHNICAL FIELD

The present disclosure relates to a pet grooming tool. In a particular form, the present disclosure relates to a pet grooming tool with a hair removal arrangement for removing hair or fur from the tool.

BACKGROUND

With the improvement of living standards, people's demand for pets has gradually increased and ownership of pets has become a part of our lives.

Many pets will shed hair or fur which unless it is removed may potentially become tangled and knotted. This can be unsightly and cause discomfort to the pet. There exist pet grooming tools specifically for removing the shed hair to assist with grooming the pet. A shaving comb is provided on the head of the grooming tool and a row of comb teeth are arranged on the comb.

U.S. Pat. No. 8,960,129 discloses a pet grooming tool including a handle, a comb incorporating a row of comb teeth and a fur ejector portion mounted on the lower side surface of the comb. The comb is mounted on the front end of the handle. When the handle is vertical, the orientation of the comb is horizontal. An actuator button is arranged at the rear end of a moveable portion that forms part of the fur ejector portion. A bias spring is provided between the fur ejector portion and the moveable portion and the movement direction of the fur ejection portion and the actuator button and the moveable portion plate align with the orientation of the comb teeth. When the actuator button is released the fur ejection portion retracts as a result of the spring.

When a pet is combed, a user's hand is held on the handle. When the fur ejection portion needs to be used in order to push out the hair caught in the gaps between the comb teeth, the thumb of the hand is stretched out to move the actuator button horizontally and the hair between the comb teeth is pushed away from the comb teeth by the fur ejector portion plate. In this manner, the user's hand is held on the handle while the force of the thumb acting on the actuator button is in a horizontally forward direction which can cause discomfort to the user's hand during grooming of the pet. Moreover, after long-term use, the built-in bias spring easily loses its elasticity resulting in the fur ejection portion failing to retract to allow normal combing of the pet.

It is against this background that the pet grooming tool of the present disclosure has been developed.

SUMMARY

In a first aspect, the present disclosure provides a grooming tool for a pet, comprising:
a handle having a grip portion;
a comb comprising teeth and including a blade for combing and removing shed hair from a pet, the comb located at a front end of the handle;
a hair removal member for removing shed hair from the comb, wherein the hair removal member is moveable in a direction corresponding to an extension direction of the teeth of the comb;
a toggle button movable along a surface of the handle between a first position and a second position; and
a linkage assembly linking the toggle button to the hair removal member to control movement of the hair removal member; wherein when the toggle button is located at the first position, a front end surface of the hair removal member is located in a retracted position and when the toggle button is moved to the second position, the front end surface of the hair removal member is moved forward to an extended position to remove hair from the comb.

In another form, the linkage assembly includes:
a first connection channel located on the hair removal member;
a connection member connected to the toggle button and configured to move with the toggle button, the connection member comprising a second connection channel;
a linkage member comprising a first arm terminating in a first engagement member and a second arm terminating in a second engagement member, the linkage member pivotable about a fixed pivot point with respect to the handle, wherein the first engagement member is received within the first connection channel and the second engagement member is received within the second connection channel and movement of the connection member causes movement of the linkage member and in turn movement of the hair removal member.

In another form, said first arm and said second arm of the linkage member form an L-shaped configuration and wherein the fixed pivot point is located at a corner of the L-shaped configuration.

In another form, a first protrusion is provided on said connecting member, and a latching protrusion is provided on an inner side of said handle; wherein when said toggle button is located at the second position, said first protrusion is located on an inner side of said latching protrusion; and when said first protrusion passes over said latching protrusion, the toggle button is located and removably retained at said first position.

In another form, said connecting member includes a base portion having a central aperture, the base portion includes a laterally extending portion, and wherein the first protrusion is located at an end of the laterally extending portion.

In another form, said first position is close to said grip portion, and said second position is away from said grip portion.

In another form, said first connection groove is located on a lower side of the hair removal member and said first connection channel is formed by four downwardly extending connection columns to receive the first engagement member; and wherein said second connection channel is located on an inner side of the base portion of the connection member and said second connection channel if formed by four inwardly extending connection columns to receive the second engagement member.

In another form, an inner side of said toggle button is provided with a connection extension terminating in a resilient locking tab configured to engage with the central aperture of the connection member.

In another form, the fixed pivot point includes a pivot aperture located on the linkage member, the pivot aperture configured to receive an axle member extending from the handle.

In another form, the handle includes a button groove in which the toggle button is operable to move from the first position to the second position and wherein the toggle button includes a manually operable region, the manually operable region configured to be convex in a middle portion and concave in a periphery portion, wherein the middle portion includes a plurality of parallel ribs.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
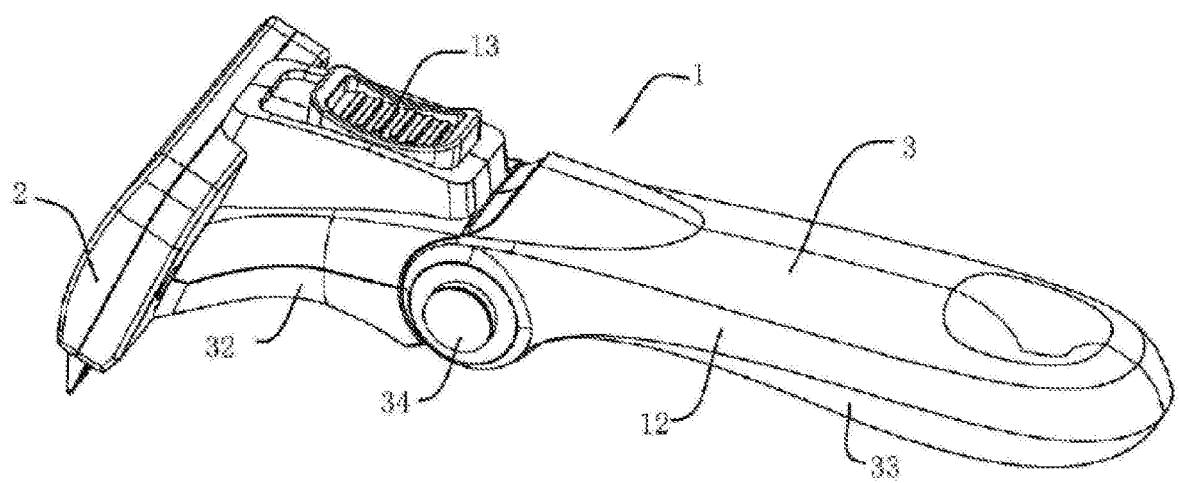
FIG. 1 is a perspective view of a pet grooming tool in accordance with an illustrative embodiment.
Figure 2:
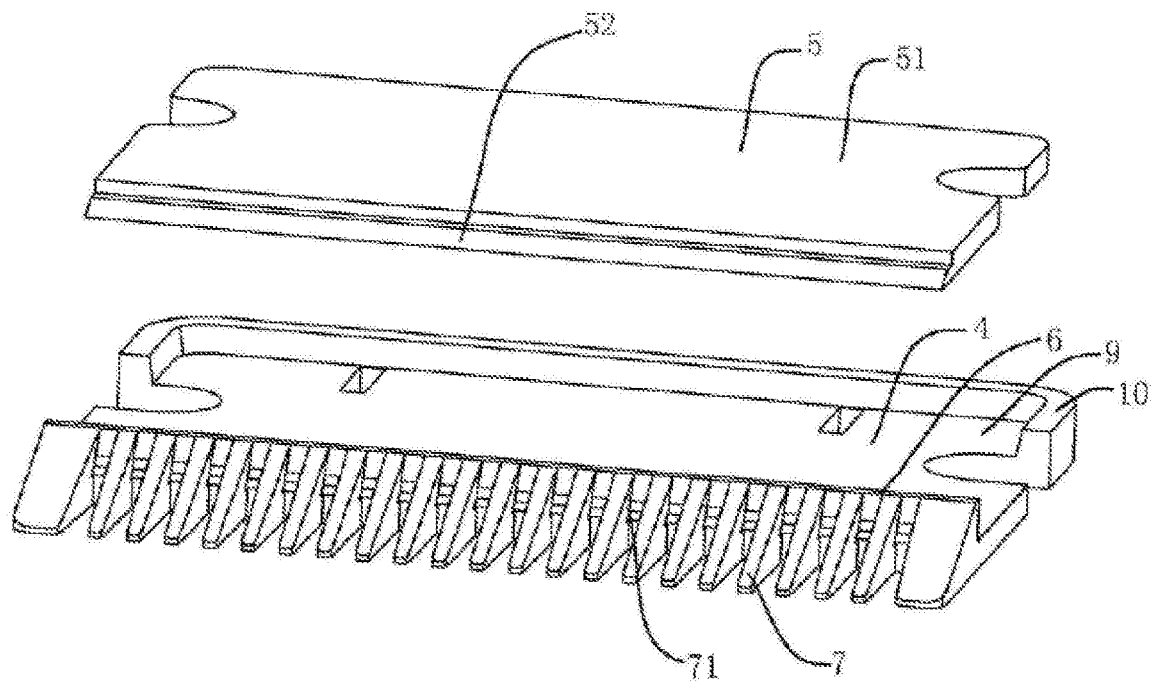
FIG. 2 is a perspective view of the separated metal blade body and a plastic comb of the pet grooming tool illustrated in FIG. 1.

Illustrative embodiments of the present disclosure will be described in detail below with reference to the accompanying drawings. Those skilled in the art will appreciate that these descriptions are only illustrative and exemplary, and should not be construed to define the protection scope of the present disclosure.

For ease of description, the pet grooming tool of the present disclosure is described below in its usual assembled position as shown in the accompanying drawings and terms such as front, rear, upper, lower, horizontal, longitudinal etc., may be used with reference to this usual position. However, the pet grooming tool may be manufactured, transported, sold, or used in orientations other than that described and depicted in the specification.

As shown in FIGS. 1 to 7, there is shown a pet grooming tool 1 for removing shed hair from a pet and which further combs the hair in the process dealing with knotted or tangled hair of the pet according to a first embodiment. In this illustrative example, pet grooming tool 1 includes a comb 2 and a handle 3. The comb 2 includes a plastic comb 4 and a metal blade body 5. The metal blade body 5 and the plastic comb 4 are detachably assembled together. The plastic comb 4 includes a elongate base portion 6 and a row of comb teeth 7 extending perpendicularly form the elongate base portion 6. After the comb 2 is assembled, the front end surface of the blade edge 52 of the metal blade body 5 exceeds the comb base portion 71 of the teeth 7 of plastic comb 4.

As shown in FIGS. 2 to 7, the metal blade body 5 and the plastic comb 4 may be separated from each other so that the metal blade body 5 may be sharpened or replaced as compared to prior art arrangements where the blade is integrated with the comb. The metal blade body 5 is mounted on one side of the plastic comb 4, but as would be appreciated the exposure of the blade edge 52 of the metal blade body 5 can present a safety hazard to the user or to the pet's skin. In accordance with the embodiment described below, the positioning of the metal blade body 5 with respect to the plastic comb 4 may be controlled precisely.

Figure 7:
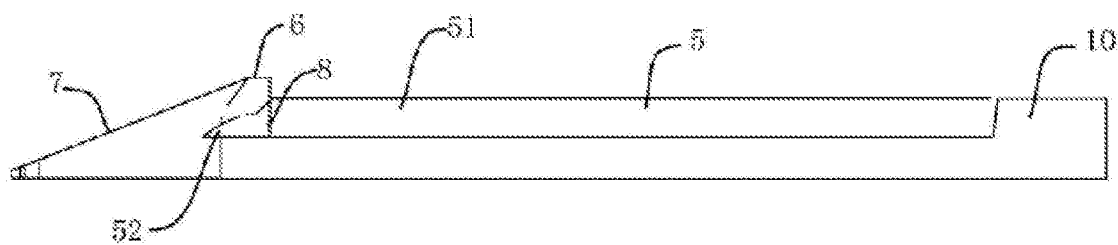
FIG. 7 is a side structural schematic view of the assembled metal blade body and the plastic comb of FIG. 2.
Figure 8:
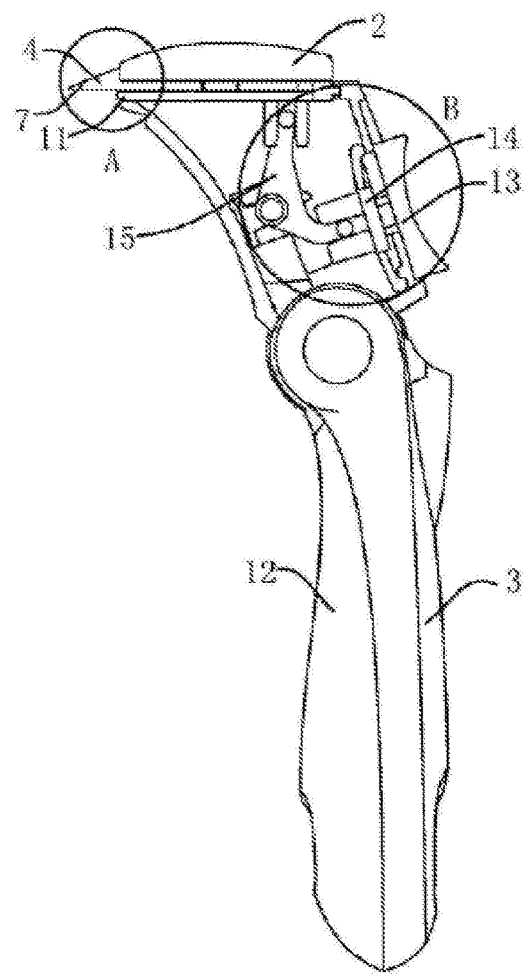
FIG. 8 is a structural schematic view of the pet grooming tool depicting the hair removal member in a retracted position.
Figure 9:
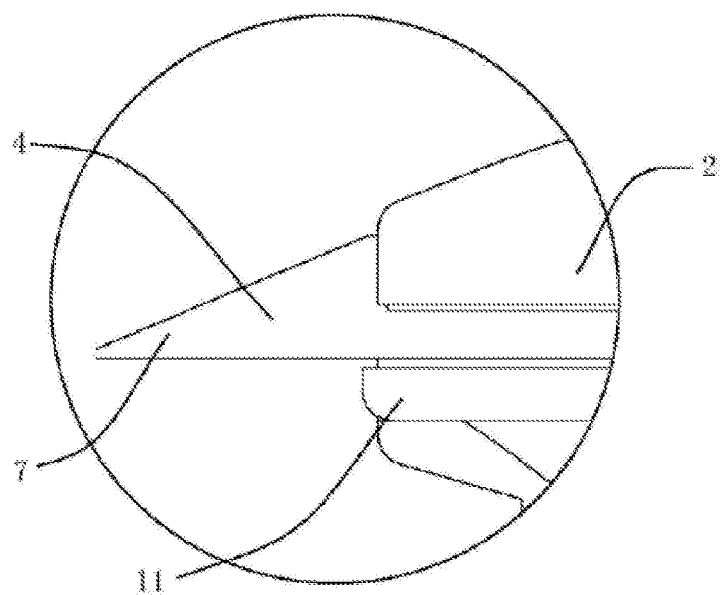
FIG. 9 is an enlarged view of A in FIG. 8.

In this example, the elongate base portion 6 forms an upper ledge for a fitting notch 8 extending forward from the elongate base portion 6 and further extending forward beyond the comb base portion 9 of the teeth 7 by a predetermined distance. On assembly, the front end of the metal blade body 5 is inserted to the fitting notch 8 and the front end of the blade edge 52 abuts the front end of the fitting notch 8 as best shown in FIG. 7 resulting in a precisely controlled exposed portion of blade edge 52 extending between the comb teeth 7 which functions as effective cutting blade.

In this manner, the blade edge 52 of the metal blade body 5 is disposed between the feet of the comb teeth 7 so that a part of the blade edge 52 is completely hidden by the feet portions of the comb teeth 7 and another part of the blade edge 52 is exposed between the respective feet portions of pairs of comb teeth 7 as the effective cutting blade edge so that the pet's knotted hair may be cut and the pet's hair smoothly combed.

Figure 3:
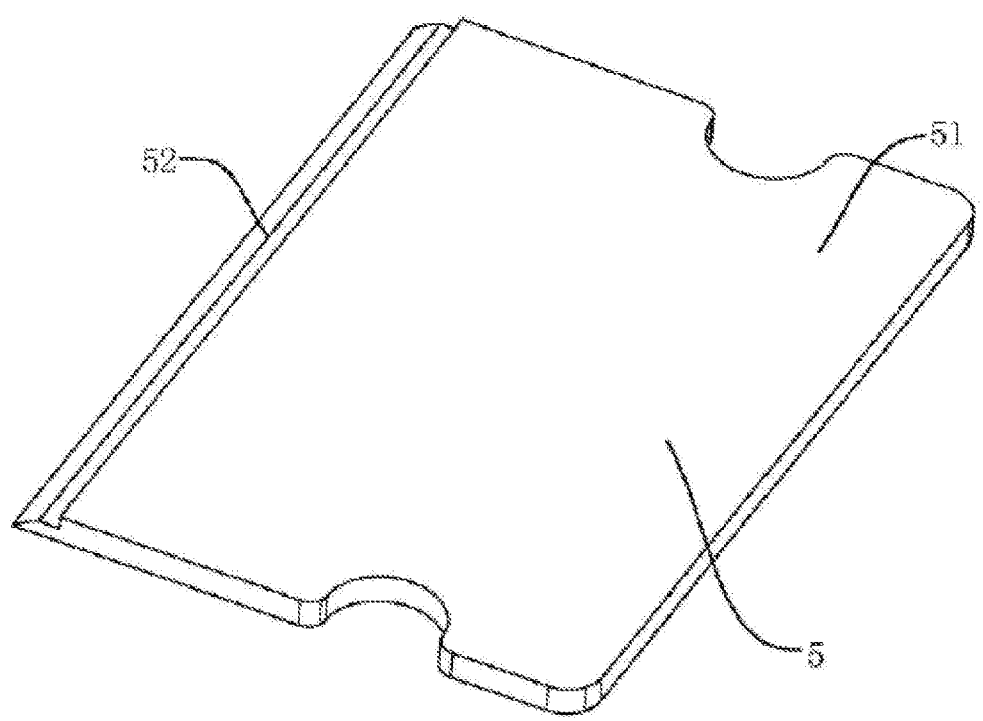
FIG. 3 is a perspective view of the metal blade body illustrated in FIG. 2.
Figure 4:
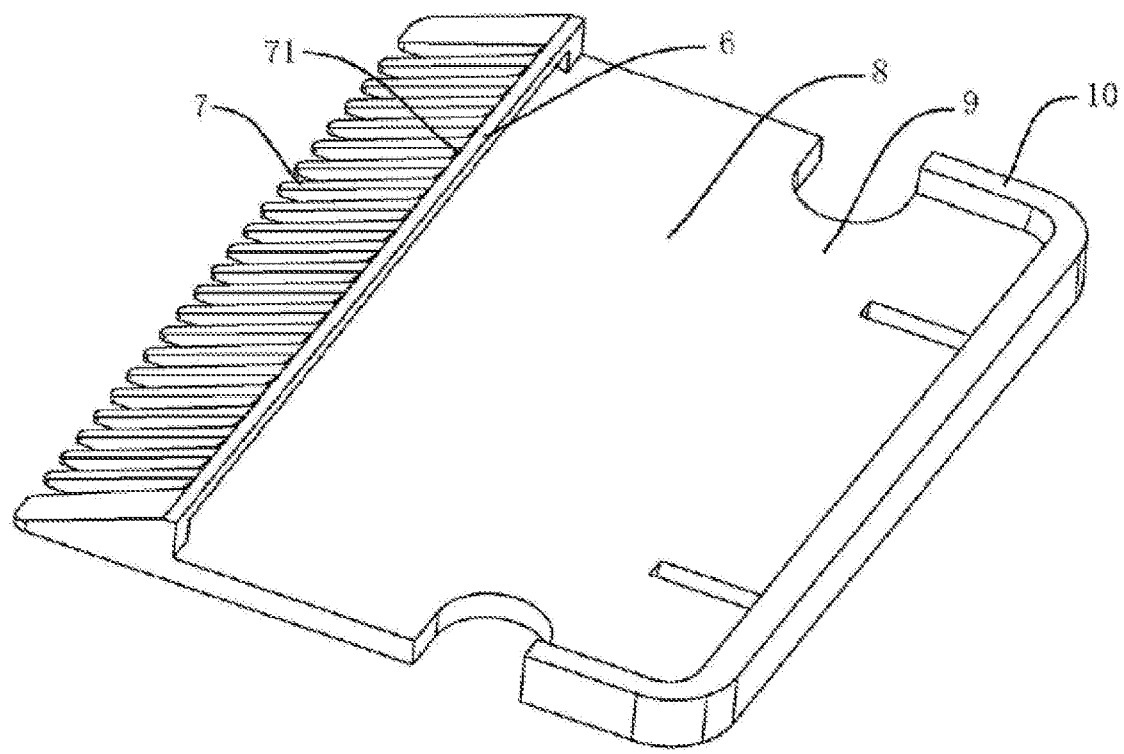
FIG. 4 is a perspective view of the plastic comb illustrated in FIG. 2.
Figure 5:
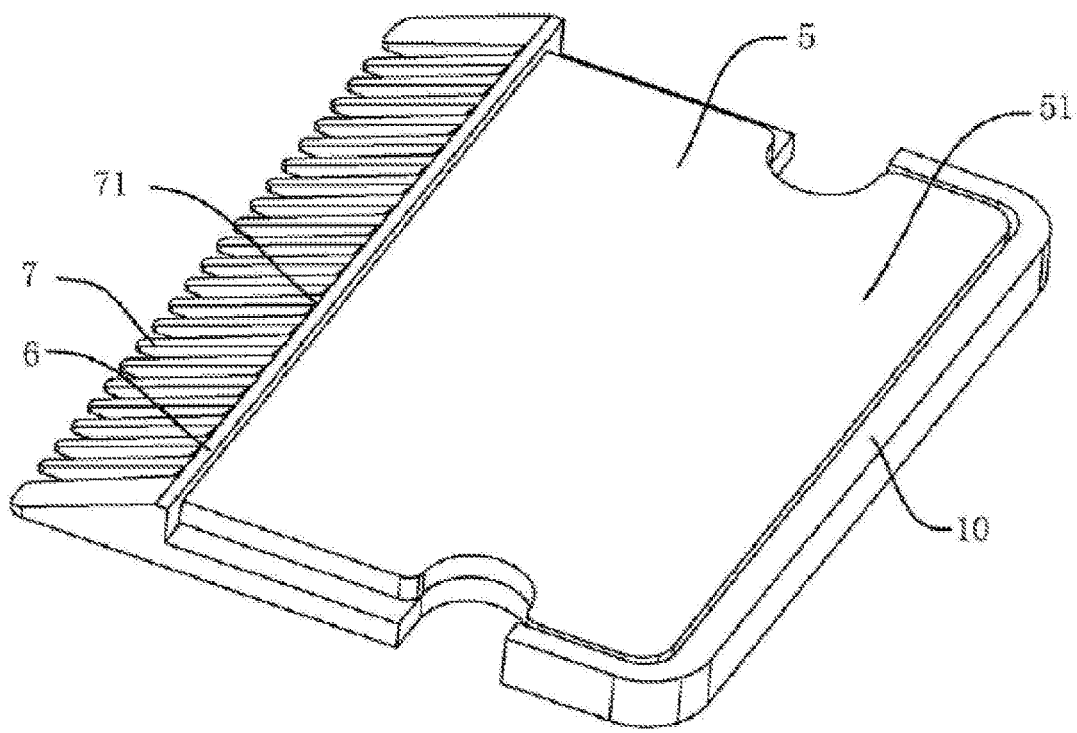
FIG. 5 is a perspective view of the metal blade body and the plastic comb of FIG. 2 after being assembled.

As shown in FIGS. 3 to 5, the plastic comb 4 includes a planar mounting surface 9 extending from the rear of elongate base portion 6, and the metal blade body 5 includes a complementary body portion 51 sized and shaped to be received by planar mounting surface 9. The longitudinal direction of the elongate base portion 6 is aligned with the horizontal direction of the comb teeth 7. In this example, the comb teeth 7, elongate base portion 6 and planar mounting surface 9 are injection molded as a unitary item. Planar mounting surface 9 is positioned beneath and offset from elongate base portion 6 resulting in the upper surface of body portion 51 of the metal blade body 5 lying flush with the upper surface of the elongate base portion 6 on insertion of blade body 5 into plastic comb 4 as has been described above.

In this example, planar mounting surface 9 includes a peripheral wall portion 10 to restrict movement of the body portion 51 of the metal blade body 5 within wall portion 10 which again allows the metal blade body 5 to be precisely positioned on assembly of the blade 5 and comb 4 assembly as the metal blade body 5 is mounted onto the planar mounting surface 9 and into fitting notch 8.

In this example, planar mounting surface 9 is in the same plane as the lower surface of the comb teeth 7 so that the injection molding process can be simplified. The base or feet portion of the comb teeth 7 extends forward and obliquely downward from the upper end surface of the elongate base portion 6 and an included angle is formed between the upper surface of the comb teeth 7 and the lower surface of the comb teeth 7 so that the cross section of each comb tooth 7 is configured as a triangle providing increased structural strength of the comb teeth 7.

Figure 6:
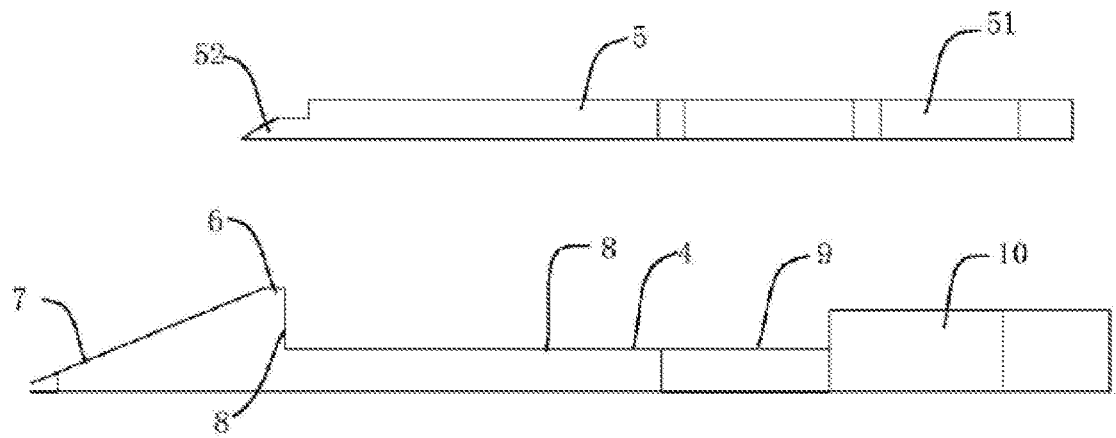
FIG. 6 is a side structural schematic view of the separated metal blade body and the plastic comb of FIG. 2.

As shown in FIG. 6 and FIG. 7, after the metal blade body 5 is mounted into the plastic comb 4, the upper surface of the body portion 51 of the metal blade body 5 is flush with the upper surface of the elongate base portion 6 further improving the structural integrity of the combined metal blade body 5 and plastic comb 4 assembly. The front end surface of the body portion 51 is located on the rear side surface of elongate base portion 6 resulting in fixing of the relative position of the metal blade body 5 with respect to the plastic comb 4.

As shown in FIGS. 8 to 13, located on the other side surface of the planar mounting surface 9 is a hair removal member 11 that can be moved back and forth. The front end surface of the hair removal member 11 is moveable between an extended position and a retracted position where in the extended position, the hair removal member 11 is extended and exceeds the front end surface of the comb teeth land in the retracted position the hair removal member 11 is retracted and positioned behind the blade edge 52.

In use, the hair removal member 11 is located on the rear side of the blade edge 52. At this time, the pet grooming tool performs the function of combing, de-shedding and/or cutting off knotted hair. When removed hair from the pet is lodged or stuck in the gaps between the comb teeth 7, the hair removal member 11 may be moved from the retracted position to the extended position so that the hair stuck on the comb teeth 7 is pushed forward to leave and clean the comb teeth 7.

In another embodiment, other parts are the same as those in the first embodiment except that the metal blade body 5 is movable back and forth with respect to the plastic comb 4. In this example, the blade edge 52 of the metal blade body 5 may be retracted from the base region of the comb teeth 7 of the plastic comb 4 and the grooming tool may then be used only for combing the hair as there is no exposed blade.

In one example, when the pet is initially combed, the blade may be exposed for the purpose of removing shed hair and/or cutting knotted hair following which the blade may be retracted for standard combing. As would be appreciated, the ability to retract the blade from the comb will reduce the likelihood of damage to the skin of the pet in cases where the pet's skin is especially sensitive. In addition, this capability will also avoid unnecessary wear and prolong the service life of the blade.

In another embodiment, the front end surface of the hair removal member 11 may be moved to a third position that is located in a middle position between the first position and the second position, and exceed and cover the blade edge 52 to allow standard combing of a pet as described above.

As shown in FIGS. 8 to 13, a pet grooming tool 1 comprising a handle 3 having a grip portion 12 and a comb 2 comprising teeth 7 and including a blade 5 for combing and removing shed hair from a pet where the comb 2 is located at a front end of the handle 3. Pet grooming tool 1 includes a hair removal member 11 for removing shed hair from the comb, where the hair removal member is moveable in a direction corresponding to an extension direction of the teeth 7 of the comb 2 and a toggle button 13 that is movable along a surface of the handle 3 between a first position and a second position.

Pet grooming tool also includes a linkage assembly linking the toggle button 13 to the hair removal member 11 to control movement of the hair removal member; wherein when the toggle button is located at the first position, a front end surface of the hair removal member 11 is located in a retracted position and when the toggle button is moved to the second position, the front end surface of the hair removal member 11 is moved forward to an extended position to remove hair from the comb 2.

When combing the pet's hair, a pet grooming tool 1 is held by hand on the grip portion 12 of the handle 3 with the plastic comb 4 at the head combing the pet's hair. When too much hair of the pet is stuck in the gaps of the comb teeth 7, the palm of the hand is still on the gripping portion 12 of the handle, and the toggle button 13 is pushed forward by lifting up the thumb to move the hair removal member 11 forward in the extended position to remove hair. Once the hair has been removed, toggle button 13 may be conveniently pushed backwards to move the hair removal member 11 backward to the retracted position to allow further combing and de-shedding to occur. As would be appreciated, a pet grooming tool 1 in accordance with the present disclosure provides a convenient and comfortable device for the grooming of a pet.

Figure 10:
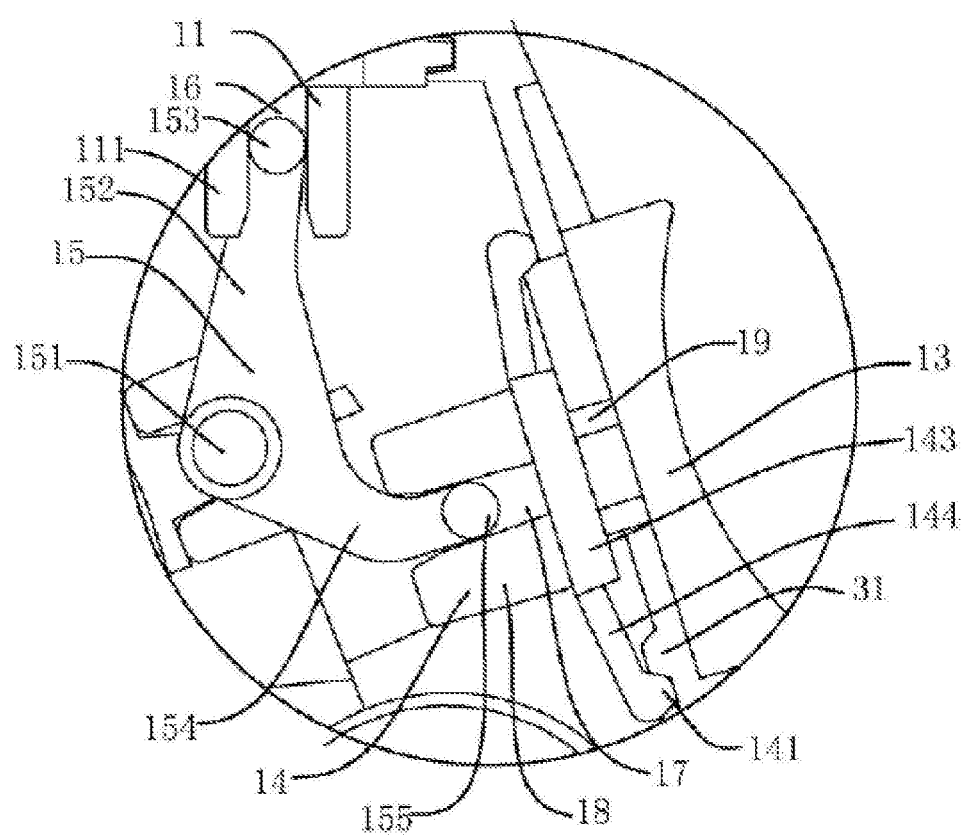
FIG. 10 is an enlarged view of B in FIG. 8.
Figure 11:
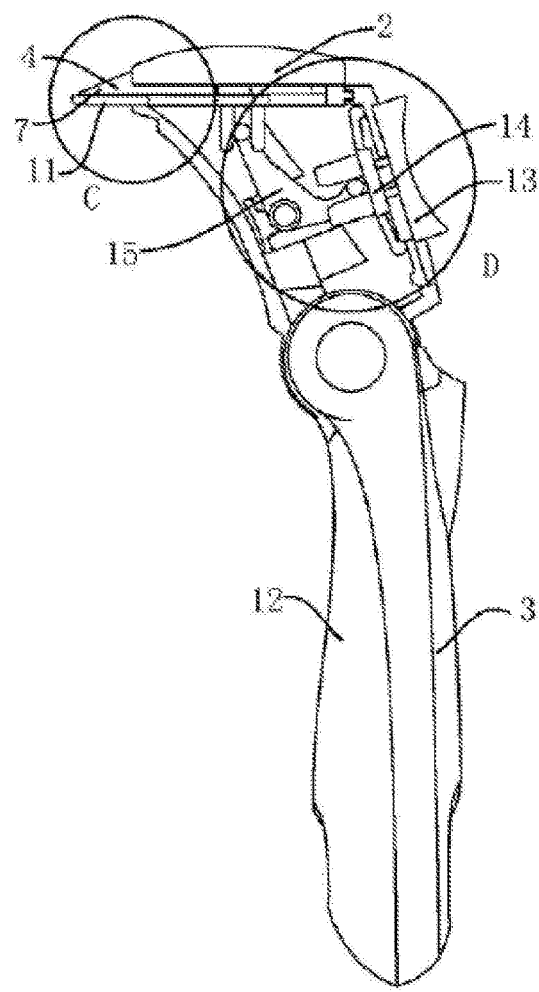
FIG. 11 is a structural schematic view of the pet grooming tool depicting the hair removal member in an extended position to remove hair from the comb.
Figure 12:
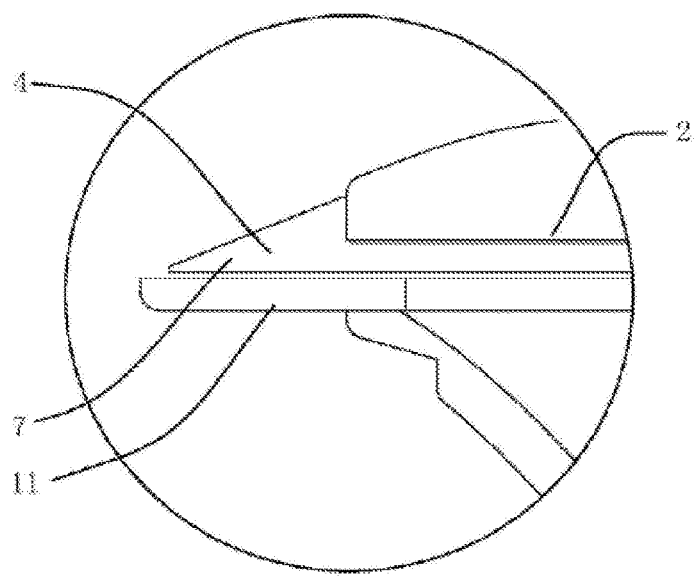
FIG. 12 is an enlarged view of C in FIG. 11.
Figure 13:
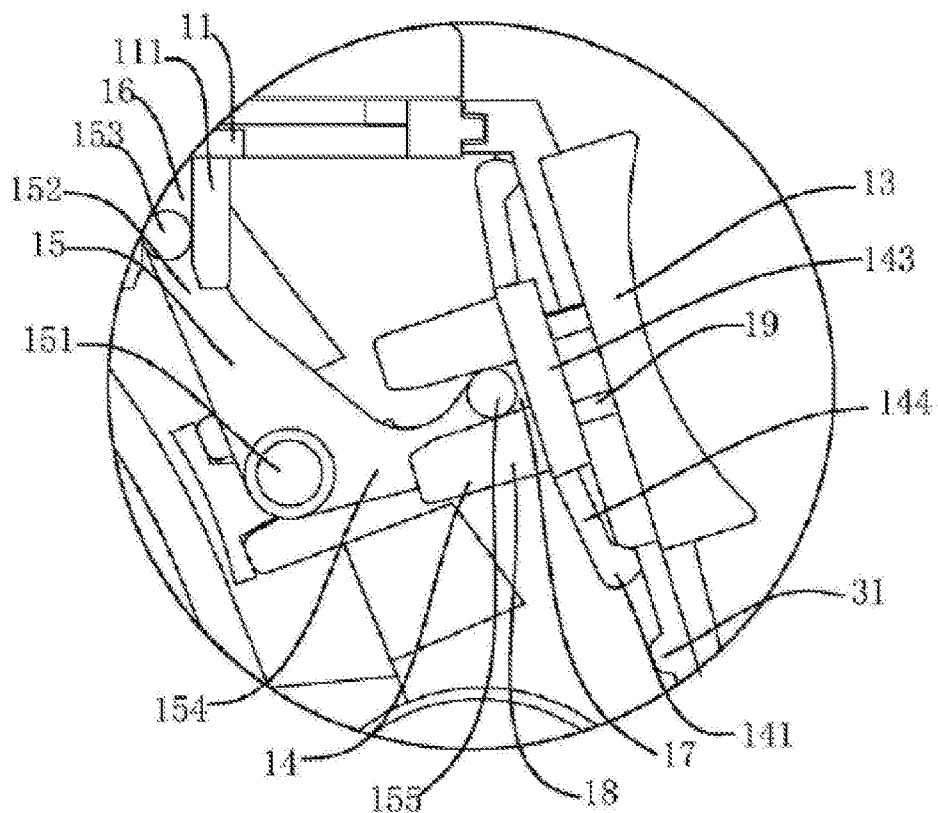
FIG. 13 is an enlarged view of D in FIG. 11.
Figure 14:
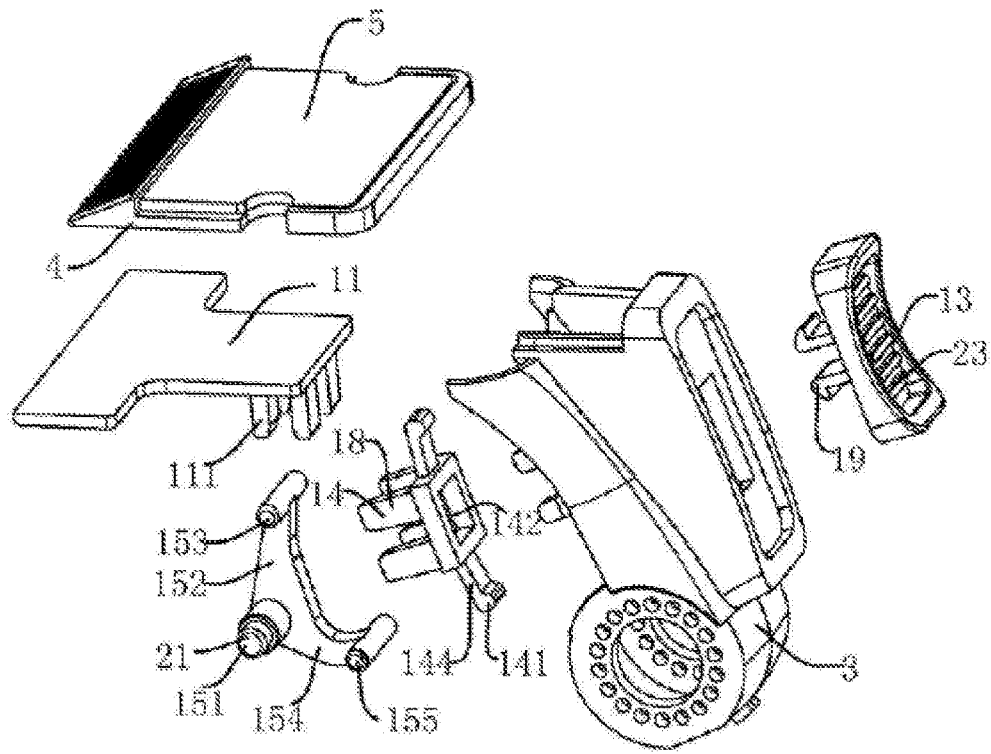
FIG. 14 is an exploded view of a linkage assembly of the pet grooming tool.
Figure 15:
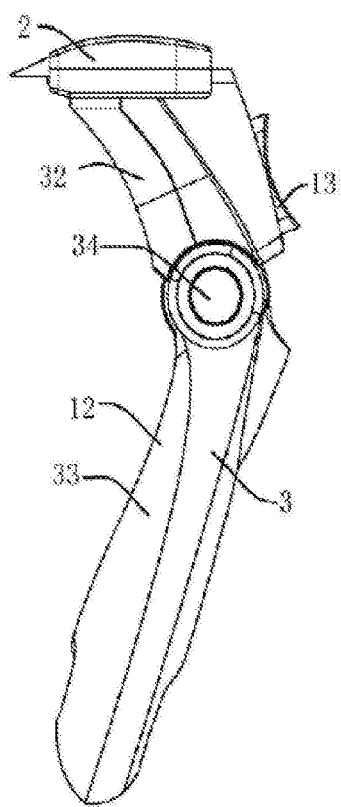
FIG. 15 is a structural schematic view of the pet grooming tool when it is bent forward at a large angle.
Figure 16:
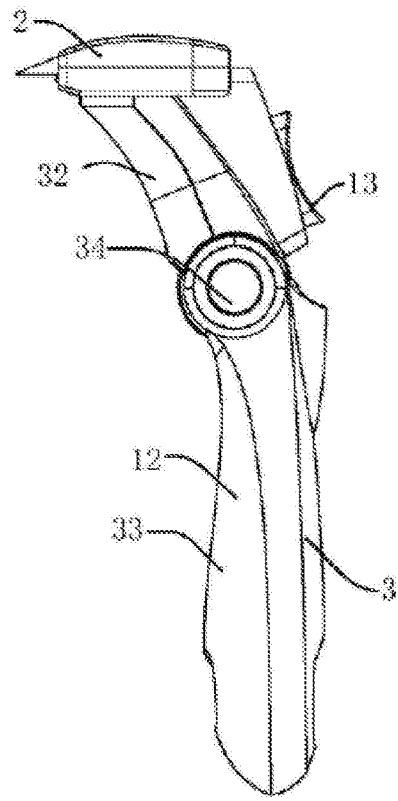
FIG. 16 is a structural schematic view of the pet shaving tool when it is bent forward at a small angle.
Figure 17:
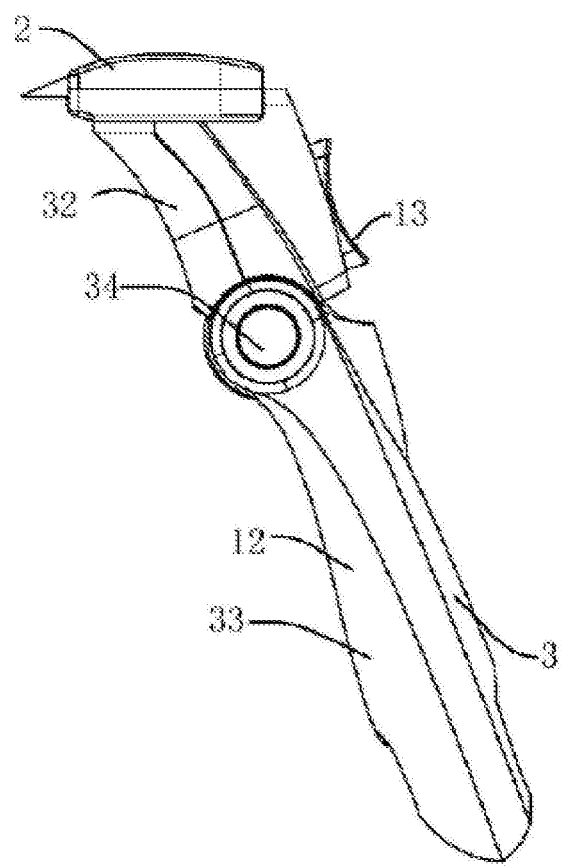
FIG. 17 is a structural schematic view of the pet grooming tool in an unbent configuration.

As shown in FIG. 10, FIG. 13, and FIG. 14, the linkage assembly includes a connection member 14 connected to the toggle button 13 and configured to move with the toggle button 13, a linkage member 15 and a first connection channel 16 located on the hair removal member 11. A second connection channel 17 is provided on the connection member 14.

The linkage member 15 comprises a first arm 152 terminating in a first engagement member 153 and a second arm 154 terminating in a second engagement member 155, the linkage member pivotable about a fixed pivot point 151 with respect to the handle 3. In this example, the first engagement member 153 is in the form of a pin or shaft and is slidably received within the first connection channel 16 and the second engagement member 155 is also in the form of a pin or shaft and is also slidably received within the second connection channel 17. As a result, movement of the connection member 14 causes movement of the linkage member 15 and in turn movement of the hair removal member 11.

In this example, the length of the second arm 154 is shorter than the length of the first arm 152, that is, movement of the toggle button 13 by a small distance will result in larger movement of the hair removal member 11. Since the movement distance of the user's thumb is smaller this provides a comfortable and ergonomic operation of the hair removal member 11. As would be appreciated, the structure of the linkage assembly provides a lever advantage so that minimum effort is required by a user operating toggle button 13.

In this example, the first arm 152 and the second arm 154 of linkage member 15 form an L-shaped configuration where the fixed pivot point 151 is located at a corner of the L-shaped configuration. In a specific embodiment, the angle of the L-shaped arm may be between 80 degrees and 135 degrees as long as the condition is satisfied that the movement direction of the toggle button 13 is switched to the movement direction of the hair removal member 11.

As shown in FIGS. 8 to 13, a first protrusion 141 is provided on the connection member 14, and a latching protrusion 31 is provided on an inner side of the handle 3. When the toggle button 13 is located at the second position, the first protrusion 141 is located on an inner side of the latching protrusion 31. When the first protrusion 141 passes over the latching protrusion 31, the toggle button 13 is located and removably retained at the first position. The connection member 14 includes a base portion 143 having a central aperture 142. The base portion 143 includes a laterally extending portion 144 where the first protrusion 141 is located at the end of the laterally extending portion 144. In this example, the connection member 14, laterally extending portion 144 and the first protrusion 141 are formed as unitary item. The laterally extending portion 144 is elastically bendable to facilitate deflection.

When the first protrusion 141 is below the latching protrusion 31, the toggle button 13 is limited to the first position. When the toggle button 13 is pushed forward by force, the deformation of the laterally extending portion 144 allows the first protrusion 141 to pass over the latching protrusion 31 so that the first protrusion 141 can transition to the other side of latching protrusion 31 and the toggle button 13 is limited to the second position. Conversely, the toggle button 13 may be transitioned from the second position to the first position once the process of the hair removal member 11 has been completed where the first protrusion 141 passes over the latching protrusion on deformation or deflection of lateral extending portion 144.

In this example embodiment, the first position is close to the grip portion 12, and the second position is away from the grip portion 12. That is, when the thumb pushes the toggle button 13 forward, the toggle button 13 is transitioned from the first position to the second position. When the thumb pushes the toggle button 13 backwards, the toggle button 13 is transitioned from the second position to the first position. In another example, the first position may be located away from the grip portion 12 and the second position may be located closer to the grip portion 12.

As shown in FIG. 10 and FIG. 13, the first connection channel 16 is located on the lower side of the hair removal member 11 and the first connection channel 16 is formed by four downwardly connection columns 111 to receive the first engagement member 153. The second connection channel 17 is located on the inner side of the base portion 143 and the second connection channel 17 is formed by four inwardly extending connection columns 18 to receive the second engagement member 155.

As shown in FIG. 14, an inner side of the toggle button 13 is provided with a connection extension 19 terminating in a resilient locking tab configured to engage to the central aperture 142 of the base portion 143. In this manner, mounting and fixing structures between the toggle button 13 and the connection member 14 can be conveniently assembled and disassembled as required.

A pivot aperture (not shown in the drawing) is provided on linkage member 15 which receives axle member 21 extending from the handle 3 to provide a fixed pivot point 151 for the linkage member 15 so that the first arm 152 and the second arm 154 may be rotated around the fixed pivot point 151 within a certain range.

As shown in FIG. 14, the handle 3 includes a button groove in which the toggle button 13 is operable to move from the first position to the second position. Toggle button 13 includes a manually operable region 22 configured to be convex in a middle portion 23 and concave in a periphery portion. In this example, the middle portion includes a plurality of parallel ribs 23 to increase the frictional force between the thumb and toggle button 13. As would be appreciated, the above configuration of toggle button conforms will with the thumb as pressure is being applied by a user grooming their pet.

As shown in FIGS. 15 to 26, there is depicted a pet grooming tool that includes a comb 2 and an adjustable handle 3, where a comb 2 is mounted on the front end of the handle 3 according to an illustrative embodiment. The handle 3 includes a first handle portion 32 and a second handle portion 33, and the first handle portion 32 and the second handle portion 33 are connected by a rotatable connection mechanism 34 to provide relative rotation of the first handle portion 32 and the second handle portion 33 to adjust the angle of bending of the handle 3. In this illustrative example, the first handle portion 32 is provided with a toggle button 13 for controlling the forward and backward movement of a hair removal member 11 and the second handle portion 33 includes a grip portion 12 for facilitating gripping of the handle 3 during grooming.

Figure 18:
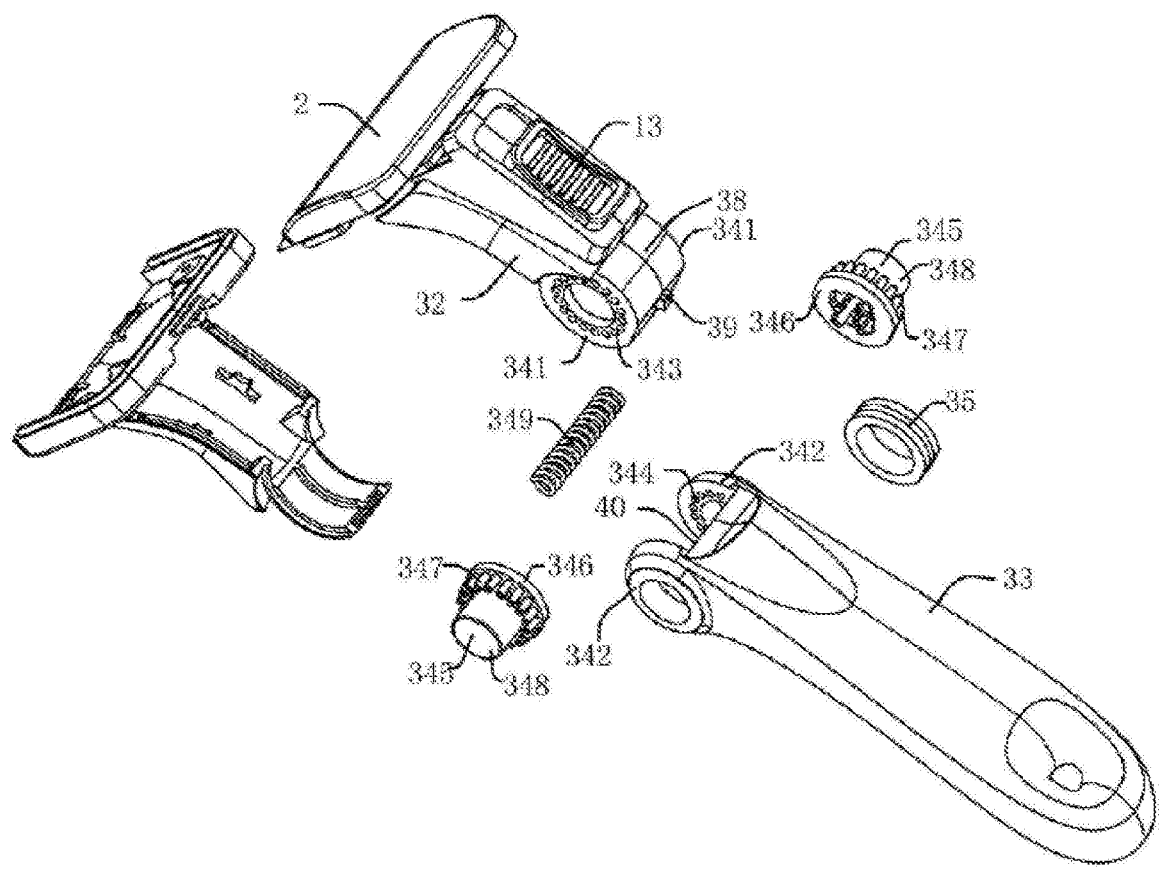
FIG. 18 is an exploded view of a rotatable connection mechanism of the pet grooming tool illustrated in FIG. 1.

As shown in FIG. 18, the rotatable connection mechanism 34 comprises two first opposed mounting portions 341 symmetrically located on the end of the first handle portion 32 where each of the first mounting portions 341 includes at least one through hole 343. Rotatable connection mechanism 34 further comprises two second opposed mounting portion 342 symmetrically fixed on the second handle portion 33 and configured to receive the pair of first opposed mounting portions 341 where each of the second mounting portions 342 includes at least two blind holes 344.

Rotatable connection mechanism 34 additionally comprises a pair of opposed locking members 345 each having a ring configuration and symmetrically located within the first opposed mounting portions 341 where each locking member 345 includes a third mounting portion 346 comprising at least one locking projection 347 extending from the third mounting portion 346 which can extend through a through hole 343 of the first mounting portion 341 and in to a blind hole 344 of the second mounting portion 342.

When the locking projection 347 on the locking member 345 leaves the blind hole 344, the first handle portion 32 is rotatable relative to the second handle portion 33 to allow the locking projection 347 on said locking member 345 to enter another blind hole 344. When the locking projection 347 on the locking member 345 enters a different blind hole 344, the first handle portion 32 is as a result adjusted and locked to a different angle with respect to the second handle portion 33 to adjust the angle of bending of handle 3.

Figure 19:
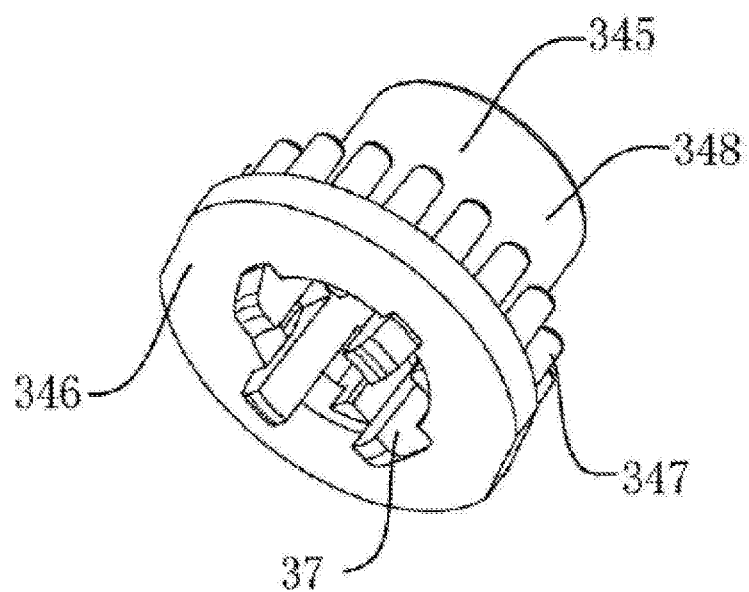
FIG. 19 is a perspective view of a locking member according to an illustrative embodiment.
Figure 20:
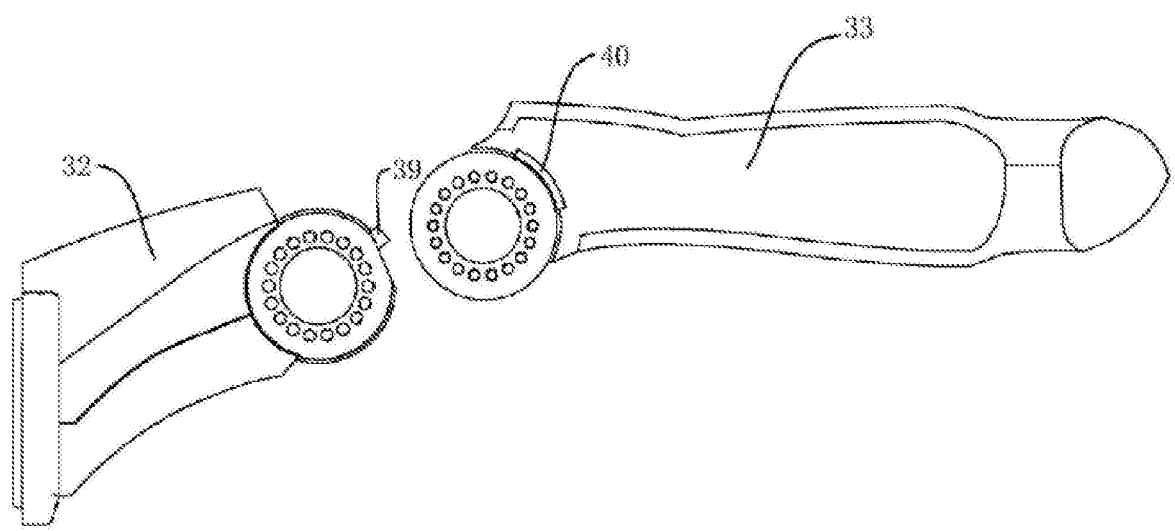
FIG. 20 is a cross-sectional view of the pet grooming tool.
Figure 21:
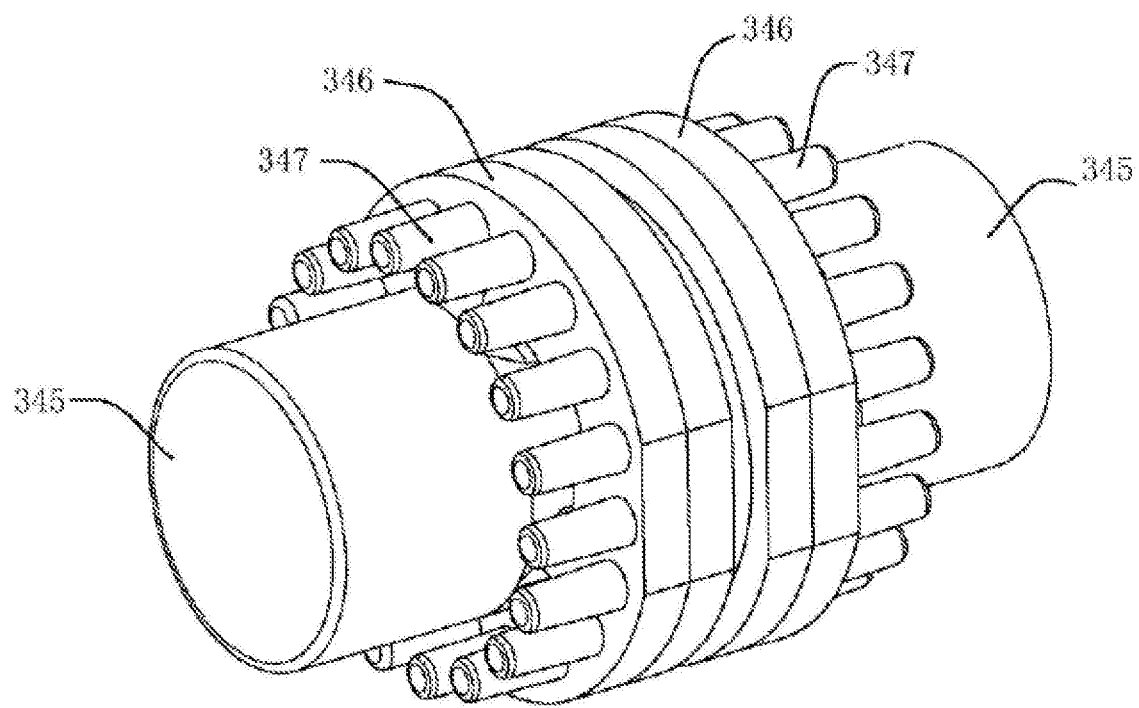
FIG. 21 is a perspective view of a locking member assembly comprising a pair of the locking members illustrated in FIG. 19.
Figure 22:
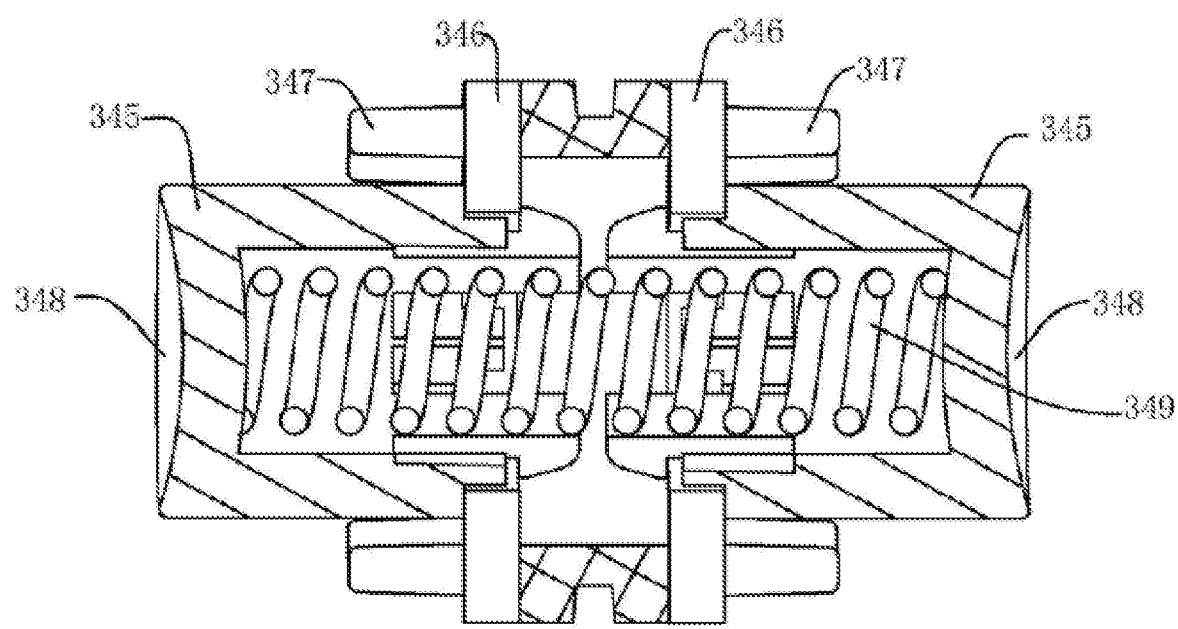
FIG. 22 is a sectional view of the locking member assembly illustrated in FIG. 21.
Figure 23:
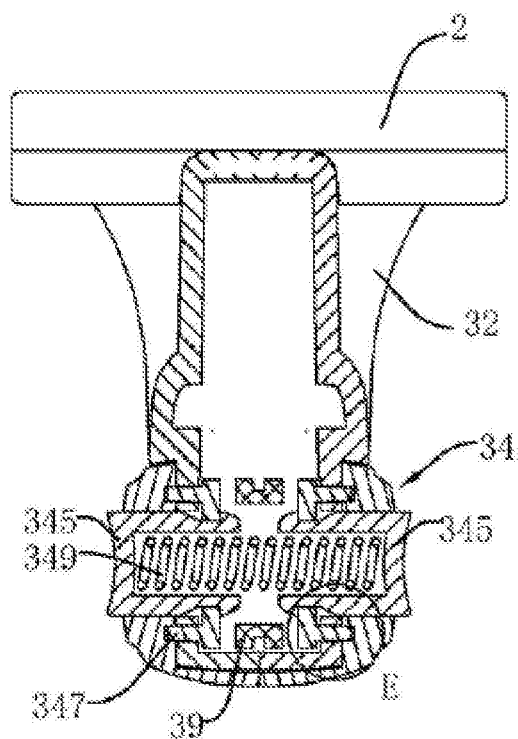
FIG. 23 is a structural schematic view depicting the locking projections of the locking members inserted into respective blind holes to lock the first handle portion with respect to the second handle portion.
Figure 24:
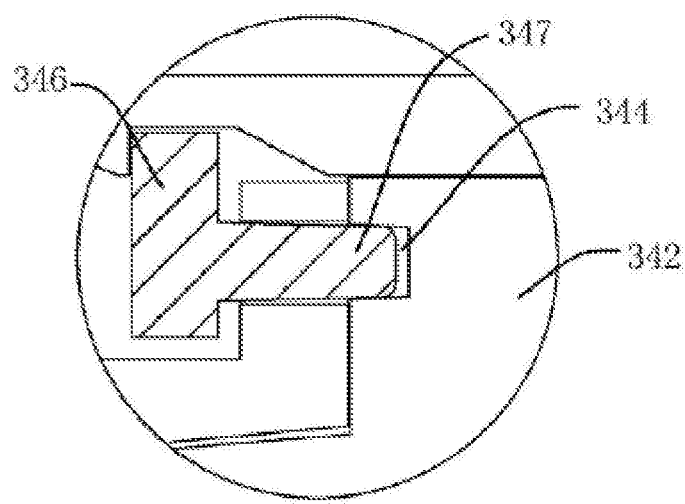
FIG. 24 is an enlarged view of E in FIG. 23.
Figure 25:
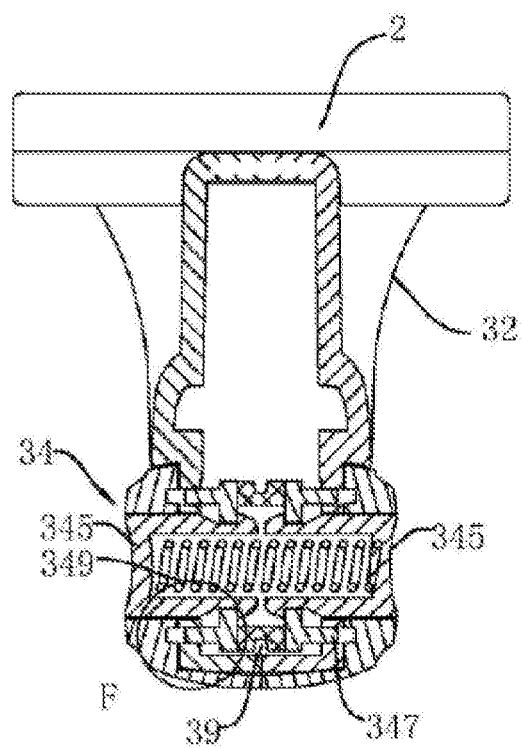
FIG. 25 is a structural schematic view depicting the locking projections of the locking members withdrawn or removed from respective blind holes to allow the first handle portion to rotate with respect to the second handle portion.
Figure 26:
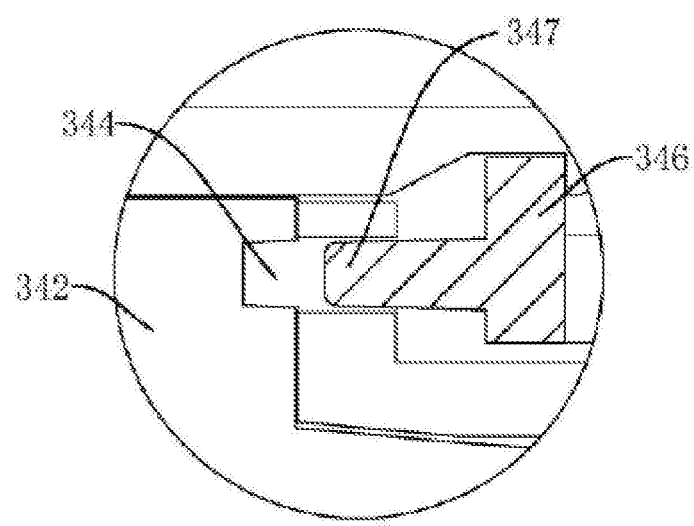
FIG. 26 is an enlarged view of F in FIG. 25.

As shown in FIG. 19 and FIG. 20, in the present embodiment, the number of the locking projections 347 on the locking member 345 is 18, and the rotation angle of the handle 3 corresponding to movement of the handle portions 32, 32 between two locking projections 347 is 20 degrees.

As would be appreciated, the number of locking projections and associated through and blind holes may be varied as required.

When the locking projection 347 on the locking member 345 passes through the through hole 343 of the first mounting portion mounting portions 341 and penetrates into the blind hole 344 of the second mounting portion 342, the first handle portion 32 and the second handle portion 33 of the handle 3 are locked to each other and cannot rotate.

When the locking projection 347 on the locking member 345 leaves the blind hole 344 of the second mounting portion 342, the first handle portion 32 and the second handle portion 33 of the handle 3 are able to rotate relative to each other. When the locking projection 347 on the locking member 345 enters a different blind hole 344 of the second mounting portion 342, the first handle portion 32 is adjusted to different angles relative to the second handle portion 33 and locked to each other, so that the relative rotation of the two sections of the handle 3 within a plane can be achieved for adjusting the magnitude of bending of the handle 3. As would be appreciated, this ability to change the magnitude of bending of the handle greatly assists a user in being able to comb or de-shed the hair on various parts of a pet.

In this example, the first mounting portion 341 comprises a first annular region 341 and a plurality of through holes 343 which are uniformly distributed on the first annular region 341. The second mounting portion 342 comprises a second annular region 342 and a plurality of blind holes 344 with the same number of through holes 343 uniformly distributed on the second annular region 342. The third mounting portion 346 includes a third annular region 346 incorporating the same number of locking projections 347 as the number of through holes 343. As such, all the locking projections 347 extending outwardly from the third annular region 346 in this example are inserted into respective through holes 343 of the first annular region 341.

As would be appreciated, this provides an improved and stable interconnection between the third annular regions 346 and the first annular regions 341 as all the locking projections 347 on the third annular region 346 are inserted into respective blind holes 344 located on the second mounting portion 342. As a result, the reliability of the connection between the second handle portion 33 and the first handle portion 32 is enhanced.

In this illustrative embodiment, the second mounting portion 342 of the second handle portion 33 is located on an outer side of the respective first mounting portion 341 of the first handle portion 32. Additionally, each of the third mounting portions 346 is located on an inner side of a respective first mounting portion 341.

As described above, the rotatable connection mechanism 34, moving from the external to the internal components, comprises opposed outermost second mounting portion 342 fixedly connected to the grip portion 12 of the handle 3. Extending from the inner side of the second mounting portion 342 there are located blind holes 344. Located on the inside of each second mounting portion 342 is the first mounting portion 341 of second handle portion 33 including through holes 343 that extend through first mounting portion 341. Located internally of each first mounting portion 341 is a respective locking member 345 including a third mounting portion 346 incorporating a plurality of locking projections 347 that extend outwardly and penetrate through the through hole 343 of the first mounting portion 341 and into the blind holes 344 of the second mounting portion 346.

As shown in FIGS. 23 to 26, each of the locking members 345 includes a locking button 348 that extends outwardly from respective locking member 345 and which is configured to extend through the respective central apertures of the first annular region 341 and the second annular region 342. In this example, locking button 348 is of a cylindrical configuration and extends through corresponding circular shaped central apertures in the first and second annular regions 341, 342.

When the buttons 348 are pressed inwardly, the locking projections 347 on the third mounting portion 346 will also move inwardly and retract and exit the blind holes 344 of the second mounting portion 346 resulting in the first handle portion 32 and the second handle portion 33 being disengaged and freed to rotate relative to each other. When the pressure of a finger on the buttons 348 is released, the return spring 349 that is located between the two buttons 348 will urge the buttons 348 outwardly resulting in the locking projection 347 located on the third mounting portion 346 moving forwardly and inserting into the blind holes 344 of the second mounting portion 346 so that the angle of bending of the first handle portion 32 with respect to the second handle portion 33 is locked.

As shown in FIG. 18, a limit ring 35 is disposed between the two third mounting portions 346 of locking members 345 to prevent the respective locking button 348 being pressed inwardly to cause the locking projections 347 on the third mounting portions 346 to be removed from the through holes of the first annular region 341. In this manner, the disposition of the limit ring 35 ensures that the third mounting portions 346 do not move backward excessively as a result preventing the locking projections 347 on the third mounting portions 346 from leaving the through holes 343 on the first annular region 341.

In this example, the locking button 348 is attached to the inner side surface of the third mounting portion 346 by a snap fit mechanism 37 to fix the locking button 348 and the third mounting portion 346 to each other. In this manner, when a finger forcefully presses the button 348 inwardly, the third mounting portion 346 will also move backwards with the button 348.

In this illustrative embodiment, two first annular regions 341 are connected by a part cylindrical shaped housing 38 of the first channel portion 32 defining an internal cavity to receive the pair of locking members 345 and their respective third mounting portions each comprising a third annular region 346 separated by limit ring 35 and return spring 349 to form a spring loaded assembly that prevents the limit ring 35 and the locking members 345 from being disengaged from the rotatable connection mechanism 34.

As shown in FIG. 20, a limit protrusion 39 is provided on the part cylinder shaped housing 38 with a corresponding limit groove 40 provided on the second handle portion 33. In operation, the limit protrusion 39 moves within the limit groove 40 to limit the magnitude of rotation between the first handle portion 32 and the second handle portion 33. Since the magnitude of rotation between the first handle portion 32 and the second handle portion 33 does not need to be too large it can be restricted to a predetermined angle. The magnitude of rotation between the two sections of the handle 3 is limited by the magnitude of movement of the limit protrusion 39 within the limit groove 40.

The advantage of a pet grooming tool in accordance with the present disclosure is that the user of the grooming tool holds the grip portion of the handle by hand and is then able to conveniently manipulate with their thumb the toggle button by pushing it up and down to control the forward and backward movement of the hair removal member which as would be appreciated is more ergonomic as the user's hand is more comfortable as the thumb doesn't have to act against a return biasing force. In addition, the use linkage assembly without a bias spring will avoid problems such as loss of restoring force due to long-term use of the bias spring and as result the durability of a pet grooming tool in accordance with the present disclosure is improved.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A grooming tool for a pet, comprising:
   a handle having a grip portion;
   a comb for combing and removing hair shed from the pet, the comb comprising teeth, a mounting surface, and a blade, wherein the blade comprises a body sized and shaped to be received by the mounting surface, the comb located at a front end of the handle;
   a hair removal member for removing shed hair from the comb, wherein the hair removal member is moveable in a direction corresponding to an extension direction of the teeth of the comb;
   a toggle button movable along a surface of the handle between a first position and a second position; and
   a linkage assembly linking the toggle button to the hair removal member to control movement of the hair removal member; wherein when the toggle button is located at the first position, a front end surface of the hair removal member is located in a retracted position and when the toggle button is moved to the second position, the front end surface of the hair removal member is moved forward to an extended position to remove hair from the comb;
   wherein the linkage assembly comprises:
   a first connection channel located on the hair removal member;
   a connection member connected to the toggle button and configured to move with the toggle button, the connection member comprising a second connection channel; and
   a linkage member comprising a first arm terminating in a first engagement member and a second arm terminating in a second engagement member, the linkage member pivotable about a fixed pivot point with respect to the handle, wherein the first engagement member is received within the first connection channel and the second engagement member is received within the second connection channel and movement of the connection member causes movement of the linkage member and in turn movement of the hair removal member.

2. The grooming tool according to claim 1, wherein said first arm and said second arm of the linkage member form an L-shaped configuration and wherein the fixed pivot point is located at a corner of the L-shaped configuration.

3. The grooming tool according to claim 1, wherein a first protrusion is provided on said connecting member, and a latching protrusion is provided on an inner side of said handle; wherein when said toggle button is located at the second position, said first protrusion is located on an inner side of said latching protrusion; and when said first protrusion passes over said latching protrusion, the toggle button is located and removably retained at said first position.

4. The grooming tool according to claim 3, wherein said connecting member includes a base portion having a central aperture, the base portion includes a laterally extending portion, and wherein the first protrusion is located at an end of the laterally extending portion.

5. The grooming tool according to claim 4, wherein an inner side of said toggle button is provided with a connection extension terminating in a resilient locking tab configured to engage with the central aperture of the connection member.

6. The grooming tool according to claim 3, wherein the fixed pivot point includes a pivot aperture located on the linkage member, the pivot aperture configured to receive an axle member extending from the handle.

7. The grooming tool according to claim 1, wherein the handle includes a button groove in which the toggle button is operable to move from the first position to the second position and wherein the toggle button includes a manually operable region, the manually operable region configured to be convex in a middle portion and concave in a periphery portion, wherein the middle portion includes a plurality of parallel ribs.

8. The grooming tool according to claim 1, wherein said first position is close to said grip portion, and said second position is away from said grip portion.

9. The grooming tool according to claim 8, wherein said first connection channel is located on a lower side of the hair removal member and said first connection channel is formed by four downwardly extending connection columns to receive the first engagement member; and wherein said second connection channel is located on an inner side of the base portion of the connection member and said second connection channel is formed by four inwardly extending connection columns to receive the second engagement member.

* * * * *